(12) United States Patent
Arnott et al.

(10) Patent No.: US 8,807,087 B2
(45) Date of Patent: Aug. 19, 2014

(54) FLUID DELIVERY DEVICE

(75) Inventors: Gary Arnott, Beckenham (NZ); Adrian Ken Joe, Matamata (NZ)

(73) Assignee: Farm Improvements Limited, Christchurch (NZ)

( * ) Notice: Subject to any disclaimer, the term of this patent is extended or adjusted under 35 U.S.C. 154(b) by 58 days.

(21) Appl. No.: 13/518,717

(22) PCT Filed: Dec. 20, 2010

(86) PCT No.: PCT/NZ2010/000259
§ 371 (c)(1),
(2), (4) Date: Jun. 22, 2012

(87) PCT Pub. No.: WO2011/078702
PCT Pub. Date: Jun. 30, 2011

(65) Prior Publication Data
US 2012/0260863 A1    Oct. 18, 2012

(30) Foreign Application Priority Data

Dec. 24, 2009 (NZ) .......................................... 577970

(51) Int. Cl.
*A01J 7/04* (2006.01)
*B05B 13/00* (2006.01)

(52) U.S. Cl.
USPC ........................................ 119/670; 239/548

(58) Field of Classification Search
USPC ............................ 239/548; 119/670, 601, 665
See application file for complete search history.

(56) References Cited

U.S. PATENT DOCUMENTS

| | | | |
|---|---|---|---|
| 5,934,220 A | 8/1999 | Hall et al. | |
| 6,055,930 A | 5/2000 | Stein et al. | |
| 6,146,263 A | 11/2000 | Mostoller et al. | |
| 6,394,029 B1 | 5/2002 | Bowers | |
| 6,443,094 B1 | 9/2002 | DeWaard | |
| 6,550,420 B1 | 4/2003 | Bjork | |
| 6,752,102 B2 * | 6/2004 | Dahl et al. ................ | 119/14.47 |
| 6,935,271 B2 * | 8/2005 | Edison et al. .............. | 119/14.47 |
| 6,948,451 B2 * | 9/2005 | Bond et al. .................... | 119/665 |

FOREIGN PATENT DOCUMENTS

| | | |
|---|---|---|
| EP | 1384400 | 1/2004 |
| GB | 1415318 | 11/1975 |
| NZ | 502723 | 7/2000 |
| WO | 9903331 | 1/1999 |

* cited by examiner

*Primary Examiner* — Yvonne Abbott
(74) *Attorney, Agent, or Firm* — Greer, Burns & Crain, Ltd.

(57) ABSTRACT

A fluid delivery device is provided for applying fluid to an object, including a spray head, a fluid conduit connected to the spray head, and a driver for moving the spray head into a spray position relative to the object, wherein the spray head includes a support arm, the support arm including at least a flexible section, an actuator to cause fluid to be sprayed via the spray head, and a control mechanism that ensures that
a) the spray head is moved by the driver substantially to an area of the object to be sprayed,
b) the fluid is supplied to the spray head once the spray head is in position, and the fluid device actuated, and
c) the spray head is withdrawn from position after spray has been supplied to the object.

13 Claims, 4 Drawing Sheets

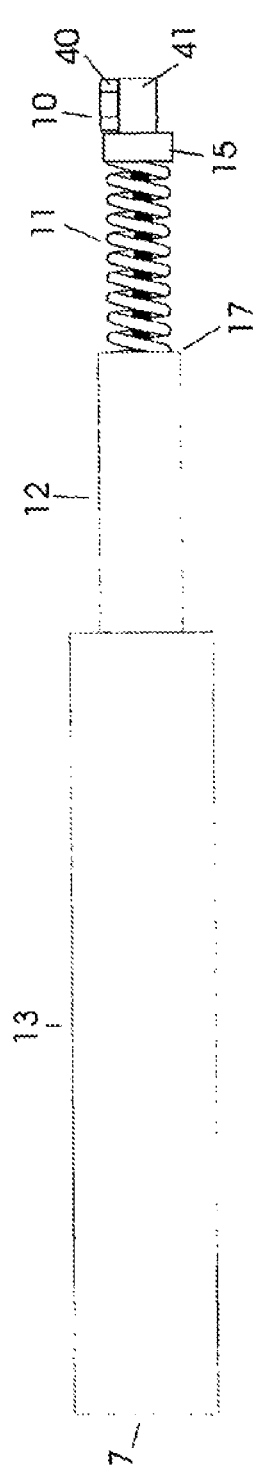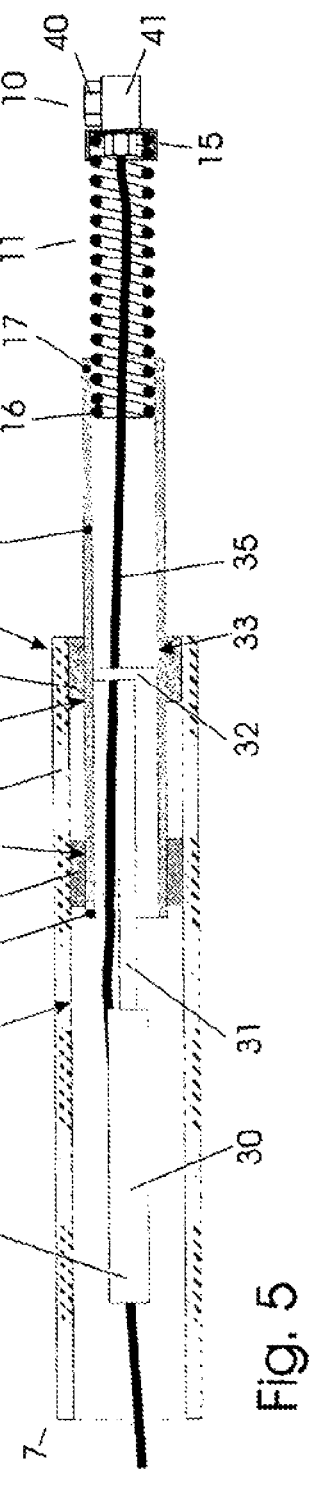

FLUID DELIVERY DEVICE

TECHNICAL FIELD

This invention relates to a fluid delivery device.

Particularly, this invention relates to a fluid delivery device for spraying fluids onto the underside of objects. Most preferably, the objects are milking animals such as cows and the fluid is sprayed onto the teats. Reference throughout the specification shall now be made to the present invention being in relation to a teat sprayer. However it should be appreciated that the principles of the present invention could be applied to other situations, for example spraying under vehicles, or objects on a factory line.

BACKGROUND

Mastitis is a serious problem within the milking industry and significant research has been conducted to ameliorate this problem. Mastitis is caused by bacteria infecting the mammary gland. Mastitis may be clinical (where there are visible signs of inflammation of the mammary gland or there are changes to the normal colour or consistency of milk); or mastitis may be subclinical where there is no visible changes to the mammary gland or milk.

Clinical mastitis when detected during lactation is normally treated with antibiotics. There is in addition to the cost of antibiotic treatment a requirement to with-hold the milk from supply, until it is clear of any antibiotic residues resulting in lost of milk income.

Subclinical mastitis is normally treated with dry cow antibiotic therapy at dry off. If clinical or subclinical mastitis is deemed un-curable; the animal is normally culled and sent to slaughter.

Both forms of mastitis results in significant financial loss to the farmer.

Therefore, it is best if practices can be put into place that prevent mastitis from occurring.

One such prevention method is the use of teat sanitisation or disinfection that prevents the contamination that occurs from one cow to another through using the same teat cups. Typically bacteria is deposited onto the teat skin by the contaminated teat cup and after milking occurs can migrate down to the teat end and enter the teat canal to cause a mastititic condition. This may occur as a consequence of being contacted with contaminated teat cups or merely from the environment in which the animals are kept.

Currently, there are two main methods by which teats are disinfected.

In countries that have smaller herds with high labour content, teats are disinfected by dipping teats in disinfectant.

The teat dipping process requires each teat to be dipped in turn until all four teats have been dipped.

In countries that have a lower labour content and larger herds (such as New Zealand and Australia) the teats are sprayed.

The teat spraying process involves spraying disinfectant on to all four teats at the same time and therefore this is less time consuming than teat dipping. In most cases, teat spraying and dipping are manual processes requiring high labour input which leads to expense and time. Further, the effectiveness of the operation is dependent on the diligence of the operator—which may be variable.

To address these issues, automated teat spraying systems have been developed, however these have problems associated with them.

One type of automated spray system is situated in the race and can spray the cow either prior to or after the cow enters the milking shed. The spray nozzles are located on the floor of the race and are triggered by a sensor.

However, in this situation the cow is moving in relation to the spray unit thus, dependent upon the speed of the cow movement, the delivery of the spray can vary. This mistimed spray can result in uneven coverage, insufficient spray delivered or even a complete miss.

Further, as a consequence of the spray unit being floor mounted a significant volume of disinfectant is required to be used to ensure that the spray reaches teats.

Yet another problem associated with race spray systems is the effect of wind drift which can cause some or all of the disinfectant solution to miss the teats. An alternative to spraying teats in the race is to spray while the cows in the milking shed.

Currently, there are three main types of milking sheds utilised.

One is the herringbone shed whereby there is a number of stationary bales surrounding a milking pit from which the farmer places the teat cups on to the cows.

Another system is the use of rotary platforms whereby the cow enters the platform which rotates (usually one full rotation per milking cycle—depending on the cow), and then exists the platform.

Finally, robotic milking systems have been gaining in popularity, particularly in Europe. This system has only one set of teat cups which animals approach in accordance with the animals whim, rather than being herded for mass milking as with the other systems.

As you can see, the position of the cow is known in relation to all of these systems. However, existing devices have a fixed location spray head or the floor which unfortunately is usually positioned too far away in relation to the cows teats making it difficult to spray the cows teats successfully.

With the herringbone system, or a rotary system, it could be possible to have individual spray heads in each bale. However this is an expensive means in terms of set up costs and maintenance.

New Zealand Patent Number 502723 describes how an existing rotary platform can be modified by cutting apertures in front of the platform. The spray head is then mechanically timed to rise through the aperture and spray the teat/udder.

Modifying a rotary platform to include this device requires the apertures to be cut in the platform and the mechanical system installed during manufacture for new installations. A retrofit installation into an existing dairy shed would require apertures to be accurately cut into the platform and the mechanical timing system installed. As can be appreciated, this exercise is likely to be too expensive and time consuming.

Further, by having spray heads located at or just above the floor of the platform can still have problems as described previously if poor coverage or excess amounts of sanitizer is being used due to the distance between the teats and the spray nozzle.

It is therefore an object of the present invention to address the above problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to one aspect of the present invention there is provided a fluid delivery device for applying fluid to an object, including
- a spray head
- a fluid conduit connected to the spray head
- the device characterised in that there is provided a driver to move the spray head into a spray position relative to the object, wherein the spray head includes a support arm, the support arm including at least a flexible section
- an actuator to cause fluid to be sprayed via the spray head, and
- a control mechanism that ensures that
    a) the spray head is moved by the driver substantially to an area of the object to be sprayed,
    b) the fluid is supplied to the spray head once the spray head is in position, and the fluid device actuated,
    c) the spray head is withdrawn from position after spray has been supplied to the object.

According to another aspect of the present invention there is provided a method of applying fluid to an object with a fluid delivery device,
- wherein the fluid delivery device includes a spray head
- a fluid conduit connected to the spray head
- a driver configured to move spray head into spray position relative to the object, wherein the spray head includes a support arm, the support arm including at least a flexible section,
- an actuator to cause fluid to be sprayed via the spray head
- a control mechanism
- the method characterised by the steps of
    a) moving the spray head by the driver substantially to an area of the object to be sprayed, and
    b) supplying fluid to the spray head once the spray head is in position, and
    c) actuating the fluid device,
    d) withdrawing the spray head from position after spray has been supplied to the object.

In preferred embodiments of the present invention, the object that is most likely to be used with the fluid delivery device is a milking animal such as a cow. However, the present invention could be used in other situations and this should not be seen as limiting.

Reference throughout the specification shall now be made to the present invention as being a teat sprayer. Again however this could be used for spraying other parts of the cows anatomy as required.

It is envisaged that in most embodiments of the present invention that the fluid being sprayed would be a sanitizer or disinfectant. However, the present invention could be used to spray other fluids, for example palliatives, dye or even water.

It is envisaged that the spray head would be any suitable nozzle that would provide sufficient coverage of fluid onto the teats. Such spray nozzles are well known in the industry.

The fluid conduit can be in a variety of forms, its main function being to convey fluid to the spray head. In one embodiment, the fluid conduit may form part of a support arm which acts to hold the spray head when in operation. Alternative embodiments may have a separate support arm to the fluid conduit with a conduit being a hose or the like depending from the spray head supported by the arm.

Reference throughout the specification will be made to a teat sprayer having a support arm for the spray head which includes the fluid conduit.

A preferred embodiment of the present invention, the support arm includes a flexible section which may form part or all of the support arm.

The purpose of having a flexible section is to minimise damage to the teat sprayer, cow or milking system if any of these are hit by the flexible section.

For example, in the preferred embodiment of the present invention, the present invention is used in relation to a rotary platform. Thus, it is possible that movement of the platform relative to the sprayer could at some occasions cause the support arm to impact upon the bales of the platform or cow legs. Thus, a flexible section can minimise damage occurring as a result. Further, it could be that the cows own movements could impact upon the sprayer.

In other embodiments of the present invention it may be that the teat sprayer is used in relation to a herringbone system whereby the teat sprayer could travel along the outside of the lines of cows being milked. Again, having a flexible section could prevent damage occurring if accidentally the arm impacted on a bale or the cows leg.

The flexible section may be provided by a number of means. In one embodiment, there is provided a coil at or near the end of the support arm. A flexible hose or sufficiently small fluid conduit may be positioned within the coil such that if the coil flexes with impact, the hose is largely unaffected.

However, the flexible section may be constructed differently. For example, this may be in the form of an articulated arm or a solid tube in a rubber like material. The main requirements of the flexible section is that it can deflect sufficiently if hit, but is sufficiently strong and rigid to support and locate the spray head.

The driver to move the spray head may come in a number of forms. In one embodiment this may be at least one ram, say pneumatic or hydraulic rams as these are robust enough to withstand the milking shed environment.

Alternate embodiments of the present invention may have the driver swing the support arm and spray head in position. For example, the motion of the spray head may not be relative to the horizontal plane of the milking shed floor or platform, but may have an arcuate motion being suspended from a pivot point above or below the cows udder.

An important thing to note is that as the present invention can move the spray head into position relative to the cow, a single teat sprayer can be used in relation to a milking shed. This saves considerable expense and obviates the need to modify existing milking platforms to receive a teat sprayer.

The sprayer position is critical to the present invention.

The purpose of having a movable spray head is to ensure that the spray head can be placed in such a position to give optimum coverage of spray on the cow teats without any of the problems identified previously—particularly with floor mounted sprayers. Thus, it is envisaged that the spray head will be positioned significantly above the floor during operation of the teat sprayer.

In preferred embodiments, the spray head is designed to spray forward and upwards of the spray arm. This way, the spray head can be positioned to optimise spray coverage of the cows teats.

In preferred embodiments the spray head extends past the cows legs.

It should be appreciated that there is considerable variability in cow anatomy and therefore in preferably the position of the spray head is adjustable both vertically and horizontally so that it can be positioned to achieve full coverage of all teats of the animal.

It is also envisages that with preferred applications of the present invention, a leg spreader would be utilised. This is usually in the form of a block of plastics material place on the ground between the cows legs. Its configuration is generally difficult to stand on—thus it is a simple way to keep the cows legs separate for spraying.

In one embodiment, the position of the spray head relative to the animal is determined through feedback from sensors on the position of the animals udder.

However in preferred embodiments the spray activation and spray head positioning is timed.

Numerous other sensors and control mechanisms may be used with the present invention. These can be used to regulate parameters such as position of the spray head, pressure of the fluid delivered to the spray head, flow rate of the fluid as well as information that the location and position of an animal in the stall including hind legs, udder and so forth.

In one embodiment, there may be provided a simple sensor system that indicates when a stall has an animal therein and that can be used to activate the teat sprayer.

Sensor systems can include any of photo-electric sensors, proximity sensors, ultrasonic sensors, electro-mechanical switches to sense cow's presence, bail position and cups on.

The timing and the amount of spray to be delivered can depend on a number of factors. In one embodiment, there may be trigger signals. For example, the support arm may pass through a first trigger point as it moves towards an operational position. Then the actuator either immediately or after a set time or distance causes fluid to be pumped through the spray head. Upon withdrawal of the spray head from the cow, a second trigger signal may be generated thus causing the supply of fluid to the spray head to be terminated.

Timing adjustments may be made by buttons on a control panel. These timings are Spray time, Extend time and Spray Start delay time.

However, in other embodiments control of the fluid might be by a certain amount of time or volume of spray being supplied to the udder area.

In a particular embodiment of the present invention, the disinfectant being sprayed may be coloured and there could be an optical sensor that determines when sufficient coverage of the udder has been achieved or whether the correct concentration of spray solution is being used.

It can be seen that the present invention has a number of advantages over the prior art. Firstly, by being able to position a spray head relative to the udder, rather than relying on a floor position spray head adequate coverage of the udder is readily achieved.

Further, the present invention allows for a single teat sprayer to be used in relation to a milking shed, rather than having individual teat sprayers per stall.

Another advantage is that existing milking platforms do not have to be modified to install the teat sprayer. This can be added as a stand alone device.

A teat sprayer is also less likely to be damaged in the rugged environment of a milking shed as preferred embodiments have a flexible section in the support arm for the spray head.

Finally, the present invention is capable of being fully automated thus removing all of the problems associated with the manual application of disinfectant through either teat dipping or spraying.

BRIEF DESCRIPTION OF DRAWINGS

Further aspects of the present invention will become apparent from the following description which is given by way of example only and with reference to the accompanying drawings in which:

FIG. 3 is a side view of the spray unit separated from the automatic teat spray;

FIG. 4 is a cross sectional view of the spray unit in the retracted (rest) position;

FIG. 5 is a cross sectional view of the spray unit in the extended position;

DETAILED DESCRIPTION

Figure 1:
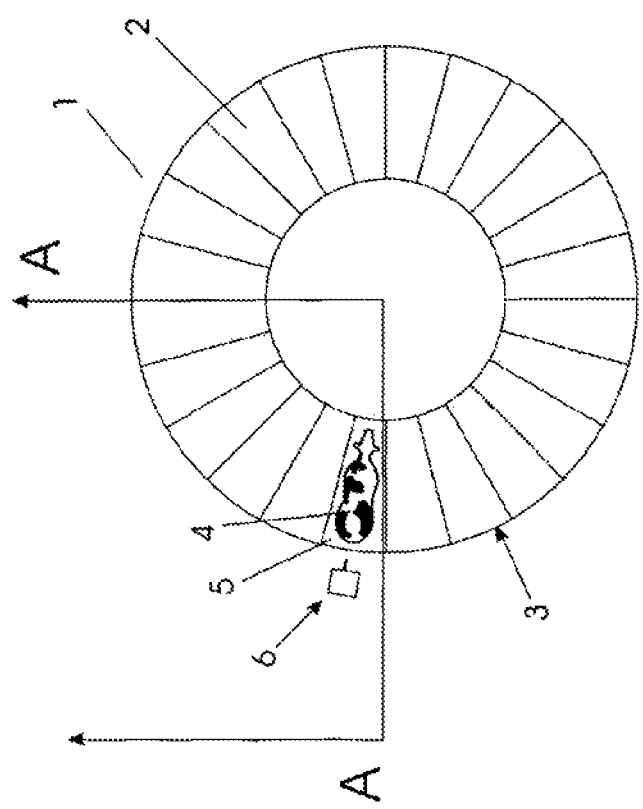
FIG. 1 is a plan view of a rotary milking platform without ancillary equipment with a cow in one stall and the automatic teat sprayer.

Referring to FIG. 1 a rotary milking platform (1), of known type, including a number of stalls (2) mounted on a moving platform (3). A cow (4) is shown in a first stall (5) and an automatic teat sprayer (6) is shown mounted on a non moving part of the rotary milking platform (1). The automatic teat sprayer (6) could equally be mounted on a stationary surface alongside the milking platform (1).

It should be noted that though the term cow (4) is used herein it is intended to cover any animal that is similarly milked; for example goats, sheep, water buffalo, horses, camels, reindeer, moose, etc, where this milking occurs (or could occur) on a moving platform (3).

Figure 2:
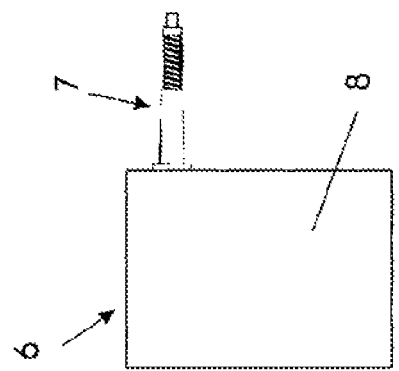
FIG. 2 is a side view of the automatic teat sprayer in isolation.

Referring to FIG. 2 the automatic teat sprayer (6) including a spray unit (7) and housing (8) is shown. The housing (8) supports and locates the spray unit (7) at the correct vertical and horizontal location. The housing (8) includes means (not shown) of known type to adjust the vertical and horizontal position of the spray unit (7) ready for use. In this embodiment the housing (8) is releasably, but rigidly, fixed to a non moving part of the milking platform (1) or stationary surface alongside the milking platform (1).

Referring to FIGS. 3 to 5 the spray unit (7) including a spray head (10), flexible section (11), extending section (12) and mounting section (13) is shown separated from the housing (8). The spray head (10) is connected to a first end (15) of the flexible section (11) which, by a second end (16), is connected to a primary end (17) of the extending section (12). The first and second ends (15,16) are opposite ends of the flexible section (11). The extending section (12) includes a secondary end (18) such that the primary and secondary ends (17,18) are the distal ends of the extending section (12).

The flexible section (11) is a coil spring of known type, is rigid and strong enough to support and locate the spray head (10), but resilient enough to deflect if hit by the cow, (4) or part of the milking platform (1), without significant damage to either.

The mounting section (13) includes two separated bushes (20,21), a casing (22) and an extension means (23). The bushes (20,21) and extension means (23) are inside the casing (22), which is a hollow prism. Each bush (20,21) is a hollow prism attached to an inner surface (25) of the casing (22). Each bush (20,21) includes an aperture (26) dimensioned to be a sliding fit with the extending section (12). The bushes (20,21) casing (22) and extending section (12) have coincident centrelines.

The extension means (23) includes a fixed section (30), an extender (31) and a connector (32). The connector (32) is attached to an inner surface (33) of the extending section (12), and the fixed section (30) is connected to the mounting section (13) by known means. The extension means (23) for this embodiment is a hydraulic or pneumatic ram, with the fixed section (30) being the barrel, and the extender (31) being the piston.

The mounting section (13) is attached to the housing (B) by known means, for example rigid or flexible fixings such as nuts and bolts, welds, rubber bushes, pins, clamps etc.

The spray unit (7) also includes a flexible pipe (35) which runs along the inside of the spray unit (7) and connects the spray head (10) to a feed tank (not shown). The feed tank contains a fluid to be sprayed onto the cow's (4) udder or teats.

The spray head (10) includes a spray nozzle (40) and mounting block (41). The spray nozzle (40) is attached to the mounting block (41), and is adapted to deliver the fluid from the feed tank to the cow's (4) udder or teats.

Figure 6:
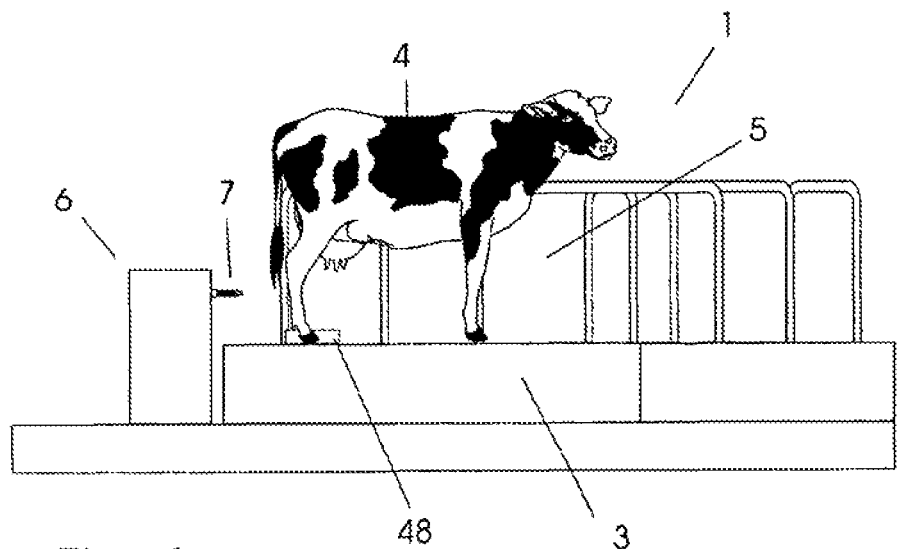
FIG. 6 is a side view of a quadrant of the rotary milking, platform in the direction of arrows A-A with the automatic teat sprayer in the rest position.
Figure 7:
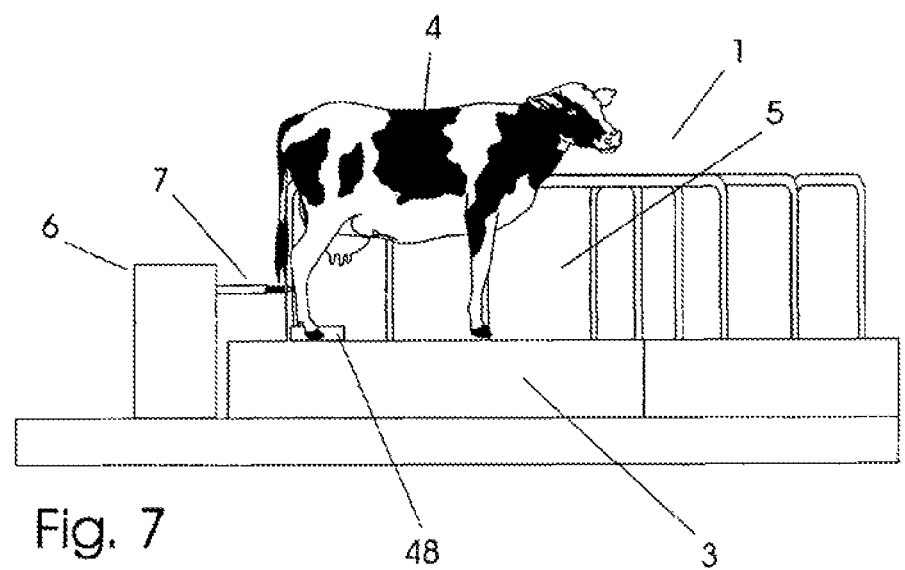
FIG. 7 is a side view of a quadrant of the rotary milking platform in the direction of arrows A-A with the automatic teat sprayer in the extended position.

Referring to FIGS. 6 and 7 a preferred means of operation is shown. The cow (4) Being carried around by the moving platform (3) arrives at the teat spraying station. The moving platform (3) includes leg spreaders (48) which due to their dimensions and shape force the hind legs of the cow (4) to be spread apart.

The automatic teat sprayer (6) detects the arrival of the cow (4), or the first stall (5), and extends the extending section (12) from a rest position to an extended position. The fluid is sprayed onto the cow's (4) teats through the spray nozzle (40) during its movement from its resting position through to its extended position and back to its rest position. The first stall continues moving to bring the next stall (2) into line, noting that the movement of the stall is not controlled by the automatic teat sprayer (6).

Figure 8:
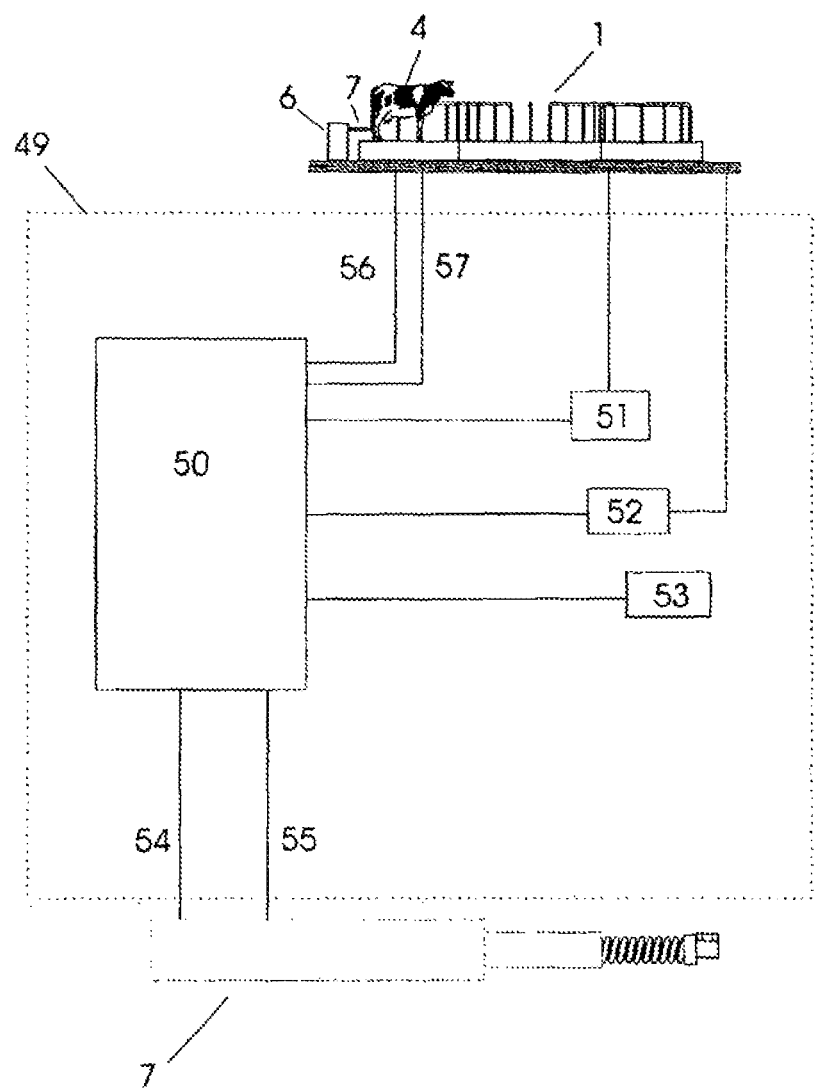
FIG. 8 is a pictorial diagram of the control system including sensors.

In use the spray head (10) passes beyond the hind legs of the cow (4). The spray nozzle (40) directs the spray between the hind legs and onto the teats of the cow (4). Referring to FIG. 8 a control system (49) including a control unit (50), sensors (51,52,53), input/control lines (54,55) to/from the spray unit (7) and inputs (56,57) from the milking platform (1) are shown. The sensors (51,52,53) are sensors of a known type and could include sensors such as infra red/ultrasonic/microwave or pressure sensors which detect the location of the cow (4), position sensors such as reed switches (or similar magnetic switches)/micro switches/pressure sensors/switches or optical sensors that detect or report the position of the stall or cow, photographic or video sensor to locate the cow (4) or similar. The input/control lines (54,55) from the spray unit transfer information such as the position of the spray head (10), the level of fluid in the feed tank, the pressure in any hydraulic lines, the pressure of the fluid in the flexible pipe (35) and/or control information to the extension means (23) and feed tank pump/valves (not shown). The inputs (56, 57) from the milking platform (1) can include an indexing signal that indicates the position of the stall, a stall occupancy indication and a leg spreader (48) indication (i.e. an indication if the cows (4) legs are wide enough apart for spraying to occur).

In use the control unit (50) receives a signal from one or more of the sensors (51,52,53) and determines there is an animal in the stall. The control unit then extends the extending section (12) from the rest position to the extended position and back to the rest position as the animal moves past. As the extending section (12) extends one or more of the sensors (51,52,53) detects the point at which spraying should commence, the first trigger position, and sends a signal to the control unit (50) which initiates the fluid flow to the spray nozzle (40). The extending section (12) continues to move to the extended position, spraying the animals teats, then returns. On the return stroke of the extending section (12) one or more of the sensors (51,52,53) detects a point at which spraying should stop, the second trigger point and sends a signal to the control unit (50) which then shuts off the fluid flow to the spray nozzle (40) and stops spraying the teats. The extending section (12) continues moving until it has returned to the rest (retracted) position ready for the next occupied stall.

In an alternative embodiment, in use the spray head (10) does not pass beyond the hind legs of the cow (4) and the fluid is sprayed onto the teats of the cow (4) on both the movement to its extended position and its movement back to the rest position. This minimises the likelihood of damaging the cow (4) if the spray cycle is mistimed.

In an alternative embodiment the housing (8) is rigidly, and semi-permanently or permanently fixed to a stationary surface on or away from the milking platform (1).

In an alternative embodiment (not shown) the bushes (20, 21) are part of the outer surface of the casing (22) and an inner surface of the extending section (12) is dimensioned and configured to slidingly engage with an outer surface of the bushes (20,21).

In an alternative embodiment the flexible section (11) is a strip of resilient material, thick walled tube of resilient material or similar.

In an alternative embodiment the movement of the milking platform (1) is timed wholly, or in part by the automatic teat sprayer(6).

In an alternative embodiment sensors (51,52,53) determine the height of the udders and teats and adjust the vertical plane of the spray head (10) accordingly.

In an additional embodiment at least one sensor (51,52,53) determines the position of the animal (4) and the control unit (5) adjusts the path of the spray head (10) for optimum coverage.

Aspects of the present invention have been described by way of example only and it should be appreciated that modifications and additions may be made thereto without departing from the scope of the appended claims.

What we claim is:

1. A fluid delivery device for applying fluid to an object, comprising:
    a spray head;
    a fluid conduit connected to the spray head;
    a driver for moving the spray head into a spray position relative to the object;
    a support arm including an extendable section and a flexible section in the form of a coil, wherein the flexible section connects the spray head to the extendable section and wherein the coil is sufficiently resilient to support and locate the spray head in its desired location and is sufficiently flexible to deflect if hit;

an actuator for causing fluid to be sprayed via the spray head; and a control mechanism that ensures that
a) the spray head is moved by the driver substantially to an area of the object to be sprayed,
b) the fluid is supplied to the spray head once the spray head is in position, and the fluid device actuated, and
c) the spray head is withdrawn from position after spray has been supplied to the object.

2. The fluid delivery device as claimed in claim 1 wherein the support arm includes a fluid conduit.

3. The fluid delivery device as claimed in claim 1 wherein the driver is in the form of at least one ram.

4. The fluid delivery device as claimed in claim 1 wherein the fluid delivery device is configured to be positioned significantly above the floor during operation of the fluid delivery device.

5. The fluid delivery device as claimed in claim 1 wherein the spray head is designed to spray forward and upwards of the support arm.

6. The fluid delivery device as claimed in claim 1 wherein the fluid delivery device is configured such that the spray head positioning and the fluid device actuation are timed.

7. A method of applying fluid to an object with a fluid delivery device, wherein the fluid delivery device includes:
a spray head,
a fluid conduit connected to the spray head,
a driver configured to move the spray head into spray position relative to the object,
a support arm, wherein the support arm includes an extendable section and a flexible section in the form of a coil, wherein the flexible section connects the spray head to the extendable section and wherein the coil is sufficiently resilient to support and locate the spray head in its desired location and is sufficiently flexible to deflect if hit,
an actuator to cause fluid to be sprayed via the spray head, and
a control mechanism,
the method comprising:
a) moving the spray head by the driver substantially to an area of the object to be sprayed;
b) supplying fluid to the spray head once the spray head is in position;
c) actuating the fluid device; and
d) withdrawing the spray head from position after spray has been supplied to the object.

8. The method as claimed in claim 7 wherein the object is a cow.

9. The method as claimed in claim 7 wherein the object is at least one of the teats of a milking animal.

10. The method as claimed in claim 7 wherein the fluid is a sanitizer.

11. The method as claimed in claim 7 wherein the method is operated in relation to a rotary milking platform.

12. The method as claimed in claim 7 wherein the operation of the fluid delivery device is timed.

13. The method as claimed in claim 7 wherein the steps of the method are controlled through the use of trigger points.

* * * * *